(12) United States Patent  (10) Patent No.: US 7,832,283 B2
Peters et al.  (45) Date of Patent: Nov. 16, 2010

(54) FLUID FLOW METER AND MIXER HAVING A FLUID DISPLACEMENT MEMBER WITH SLOPED WALLS

(75) Inventors: Robert J. W. Peters, Linlithgow (GB); Floyd McCall, Murietta, CA (US); Joyann Gongaware, legal representative, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 117 days.

(21) Appl. No.: 12/295,235

(22) PCT Filed: Mar. 29, 2006

(86) PCT No.: PCT/US2006/011463

§ 371 (c)(1),
(2), (4) Date: Sep. 29, 2008

(87) PCT Pub. No.: WO2007/086897

PCT Pub. Date: Aug. 2, 2007

(65) Prior Publication Data

US 2009/0165566 A1 Jul. 2, 2009

(51) Int. Cl.
*G01F 1/37* (2006.01)
(52) U.S. Cl. ............. 73/861.52; 73/861.55; 73/861.58
(58) Field of Classification Search ................ None
See application file for complete search history.

(56) References Cited

U.S. PATENT DOCUMENTS

| | | |
|---|---|---|
| 613,093 A | 10/1898 | Tyson |
| 1,000,385 A | 8/1911 | Eberle |
| 1,126,275 A | 1/1915 | Rice |
| 1,454,196 A | 5/1923 | Trood |
| 1,535,702 A | 4/1925 | Walsh et al. |
| 1,810,131 A | 6/1931 | Daily |
| 1,942,293 A | 1/1934 | Kane |
| 2,021,092 A | 11/1935 | Teliet |
| 2,068,567 A | 1/1937 | Palmer |
| 2,585,205 A | 2/1952 | Young |
| 2,595,720 A | 5/1952 | Snyder |
| 2,805,966 A | 9/1957 | Etheridge |
| 2,942,465 A | 6/1960 | Carbone |
| 3,049,009 A | 8/1962 | McCall et al. |
| 3,143,401 A | 8/1964 | Lambrecht |

(Continued)

FOREIGN PATENT DOCUMENTS

GB 752822 * 7/1956

(Continued)

*Primary Examiner*—Harshad Patel
(74) *Attorney, Agent, or Firm*—Greer, Burns & Crain, Ltd.

(57) ABSTRACT

Fluid flow apparatus, such as a fluid flow meter, a fluid mixing device or a fluid dispersing device, includes a fluid displacement member (40) mounted in a conduit (20) and having a sloped exterior wall (48) forming a periphery on the member for deflecting the fluid to flow through a region of progressively decreasing area defined between the periphery of the member and the interior surface of the conduit. The displacement member is a hollow frustum (42) terminating at the plane of its outer peripheral edge (46) and accommodating flow measurements at or adjacent the axis of the conduit at or adjacent the plane of the peripheral edge of the displacement member.

22 Claims, 1 Drawing Sheet

U.S. PATENT DOCUMENTS

| | | | |
|---|---|---|---|
| 3,196,680 A | 7/1965 | Curran | |
| 3,376,023 A | 4/1968 | Lage | |
| 3,467,072 A | 9/1969 | Toesca | |
| 3,489,396 A | 1/1970 | D'Aragon | |
| 3,572,117 A | 3/1971 | Rodely | |
| 3,671,025 A | 6/1972 | Elliott | |
| 3,675,901 A | 7/1972 | Rion | |
| 3,733,898 A | 5/1973 | Yamamoto et al. | |
| 3,759,096 A | 9/1973 | White | |
| 3,968,932 A | 7/1976 | Kimmell | |
| 4,008,611 A | 2/1977 | Turocy | |
| 4,051,204 A | 9/1977 | Muller et al. | |
| 4,237,739 A | 12/1980 | Owen et al. | |
| 4,275,841 A | * | 6/1981 | Takeyama et al. |
| 4,299,655 A | * | 11/1981 | Skaugen |
| 4,350,047 A | * | 9/1982 | Dewey, Jr. et al. |
| 4,491,551 A | * | 1/1985 | Johnson |
| 4,522,151 A | * | 6/1985 | Arbisi et al. |
| 4,576,204 A | * | 3/1986 | Smallhorn et al. |
| 4,638,672 A | * | 1/1987 | McCall |
| 4,812,049 A | * | 3/1989 | McCall |
| 4,926,698 A | * | 5/1990 | Owen |
| 5,363,699 A | * | 11/1994 | McCall |
| 5,554,805 A | * | 9/1996 | Bahrton |
| 5,814,738 A | * | 9/1998 | Pinkerton et al. |
| 7,500,405 B2 | * | 3/2009 | McCall et al. |

FOREIGN PATENT DOCUMENTS

| | | | |
|---|---|---|---|
| GB | 2146781 | * | 4/1985 |
| WO | WO/2006/022702 | * | 2/2006 |
| WO | WO/2007/086897 | * | 2/2007 |

* cited by examiner

FLUID FLOW METER AND MIXER HAVING A FLUID DISPLACEMENT MEMBER WITH SLOPED WALLS

TECHNICAL FIELD

The present invention relates to fluid flow apparatus and, in particular, to fluid flow meters, fluid mixers and fluid dispersing devices.

BACKGROUND ART

U.S. Pat. Nos. 4,638,672, 4,812,049, 5,363,699 and 5,814,738, and co-pending International Patent Application No. PCT/US2004/025900 disclose fluid flow meters and fluid dispersing and mixing devices which are characterized by a unique static fluid flow displacement member which is mounted symmetrically within a conduit and which is effective to linearize fluid flow through the conduit within a region defined between the displacement member and the interior surface of the conduit and to flatten the velocity profile of fluid flow in the conduit both upstream and downstream from the displacement member.

The apparatus ensures reliable measurement of fluid flow conditions within the conduit and also provides for homogeneous blending of diverse fluids and/or fluids containing particulate matter.

The unique fluid flow meters and mixers are made and sold under the registered trademark "V-CONE" by McCrometer, Inc. of Hemet, Calif., which is the owner of the above patents and patent application and the present invention.

The fluid flow displacement member in the V-CONE devices is comprised of two frustums, usually conical, joined at their larger ends and mounted coaxially in an individualized section of conduit. The frustums are mounted substantially normal to the axis of the section and the direction of fluid flow and with their peripheries spaced symmetrically inward from the interior surface of the conduit section. Depending upon the dimensions of the displacement member relative to the internal diameter of the conduit, the displacement member is effective to linearize fluid flow over a range of flow rates through the section.

In some embodiments, the displacement member is made by joining two frustums together at their larger ends, usually by welding. The frustum facing in the upstream direction is customarily joined, e.g., by welding, at its upstream and smaller end to a pipe or tube which extends through the displacement member to its downstream face and through which a pressure reading is taken or through which a secondary fluid is introduced for mixing with a primary fluid flowing through the conduit. The pipe or tube is bent outwardly and extends through the wall of the conduit section upstream from the displacement member. The pipe or tube is joined, e.g., welded, to the wall of the conduit section and conveniently serves as the means for mounting the displacement member coaxially within the section.

In the embodiments above described, a separate flowmeter and its associated flow sensing devices are required for each of the various sizes of flowmeters needed for linearizing and measuring fluid flows over respective ranges of flow rates.

U.S. Pat. No. 5,814,738 discloses an embodiment of the V-CONE device wherein the fluid flow displacement member is removeably and replaceably mounted in the downstream end of the conduit section so that a given displacement member can be removed and replaced by one or more different displacement members in order to accommodate different fluids and different ranges of fluid flow through the conduit section. In this way, a single section of conduit, i.e., a single meter body, can be used with a variety of displacement members to accommodate various liquids and gases and a broad range of flows through the meter body.

The latter embodiment of the device also provides flow measurement taps through the wall of the conduit section or meter body so that no measurement taps or other holes or passages are required in the displacement member. However, it has since been discovered that for some fluids, especially high velocity gases, measurement of the pressure at the downstream side of the displacement member by a tap in the conduit wall is not as accurate as the downstream measurements obtained with the earlier embodiments of the V-CONE device.

International application No. PCT/US2004/025900 discloses a meter/mixer that combines the advantages and overcomes the disadvantages of the earlier versions of the V-CONE device. In particular, the application discloses ways and means for removeably and replaceably mounting the fluid flow displacement member in the conduit at its upstream end and for taking pressure measurements at the axis of its downstream end. Thus, the advantages of replaceability and accuracy of measurement are both attained.

DISCLOSURE OF INVENTION

The object of the present invention is to further improve upon the devices disclosed in the above listed patents and patent application and the commercial embodiments of the V-CONE meters and mixing and dispersing devices.

It is in particular an object of the invention to provide fluid flow displacement members for said devices that do not require the downstream frustum and the complex manufacturing and testing procedures required of the prior displacement members.

In accordance with the invention, each displacement member comprises a single hollow frustum having the same external configuration as the upstream frustum of the prior devices and having passages therein accommodating pressure measurements to be taken along the axis of the downstream facing internal surface of the hollow frustum.

The hollow frustum has an exterior wall which slopes outwardly from the axis of the frustum in the downstream direction and an interior wall which likewise slopes outwardly from the axis of the frustum in the downstream direction. The frustum terminates at its downstream end in a peripheral edge that is spaced symmetrically inward from the wall of the fluid flow conduit and that defines a plane substantially normal to the direction of fluid flow. At its upstream end, the displacement member includes an axial body portion for mounting, preferably detachably mounting, the displacement member axially and symmetrically within the conduit. The displacement member and its mounting assembly have passages therein leading to a point along the axis of the frustum at which a pressure measurement may be made.

The hollow frustum displacement member of the invention affords the same high performance and flow measurement accuracy as the earlier V-CONE devices, and it provides the advantages of displacement member replaceability and flow measurement at the axis of the downstream face of the displacement member. In addition, and importantly, the hollow frustum displacement member of the invention facilitates fabrication of flow meters and mixers in a more reliable and repeatable fashion to consistently meet preset standards without need for individual testing and calibration.

These and other objects and advantages of the invention will become apparent to those of reasonable skill in the art

BEST MODE OF CARRYING OUT THE INVENTION

The following is a detailed description of preferred embodiments of the invention presently contemplated by the inventor to be the best mode of carrying out the invention. Modifications and changes will become apparent to persons of reasonable skill in the art as the description proceeds.

Figure 1:
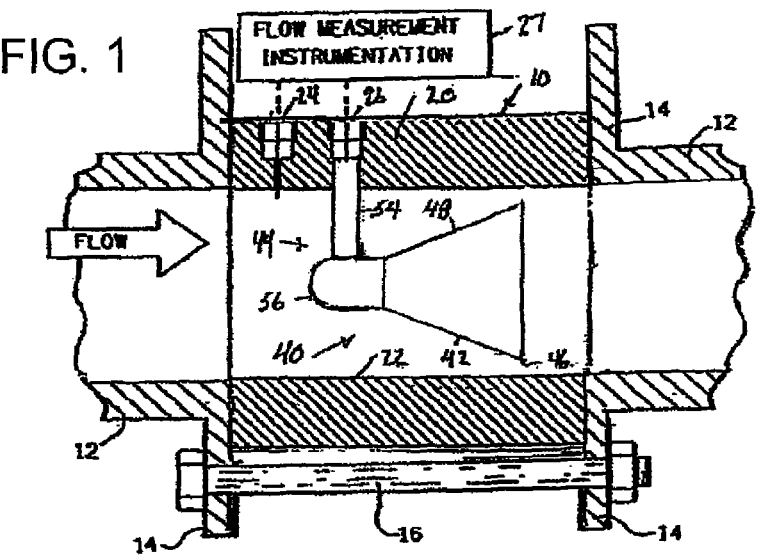
FIG. 1 is a longitudinal cross section of a fluid flow meter comprising a preferred embodiment of the invention.

Referring to FIG. 1, a fluid flow meter made in accordance with the invention, indicated generally at 10, is adapted to be installed in a pipeline or other fluid flow conduit which is depicted as being comprised of pipe sections 12 having bolting flanges 14 at their ends. The flow meter 10 is comprised of a meter body or conduit section 20 and a fluid flow displacement device 40 mounted coaxially within the body. The meter body 20 comprises, in essence, a section of pipe or conduit adapted to be bolted or otherwise secured between two sections of pipe, for example, between the flanges 14 of the illustrated pipe sections 12. The meter body illustrated, by way of example, is of the so called wafer design and is simply confined between the flanges 14 and centered or axially aligned with the pipe sections 12 by means of circumferentially spaced bolts 16 (only one shown) extending between and connecting the flanges. However, the conduit section 20 may be of any suitable pipe configuration, such as a flanged section or weld end section, etc.

The section 20 has an internal bore or through hole 22 which in use comprises a part of, and constitutes a continuation of the path of fluid flow through the pipeline 12. As indicated by the arrow, the direction of fluid flow is from left to right as viewed in the drawings. The pipeline 12 and conduit section 20 are usually cylindrical and the bore 22 is usually, though not always, of the same internal cross section and size as the pipe sections 12.

Longitudinally spaced flow measurement taps 24 and 26 extend radially through the body 20 at locations and for purposes to be described.

The displacement device 40 is comprised of a flow conditioning portion or displacement member 42 and a support or mount 44.

The flow conditioning or displacement member 42 is comprised of a body, usually cylindrical, which has a major transverse diameter or dimension at edge 46 and a sloped wall 48, usually conical, which faces in the upstream direction in the meter body and which tapers symmetrically inward toward the axis of the body. Except as hereinafter described, the flow conditioning member 42 has characteristics similar to and functions in much the same manner as the flow displacement members utilized in the "V-CONE" devices available from McCrometer Inc. and those described in U.S. Pat. Nos. 4,638, 672, 4,812,049, 5,363,699 and 5,814,738, the disclosures of which are incorporated herein by reference, as though here set forth in full.

As described in the prior patents, the member 42 is of a smaller size than the bore 22 in the conduit 20 and is mounted coaxially within the bore normal to the direction of fluid flow and with the sloped wall 48 spaced symmetrically inward from the interior or inner surface of the wall of the conduit. The larger end of the sloped wall 48 terminates at a sharp peripheral edge 46, the plane of which lies normal to the direction of fluid flow. The wall 48 is formed at an angle in the order from about 39° to about 75° to the plane defined by the peripheral edge 46, a preferred angle being in the order of about 67.5°. The Beta ratio of the member 42 relative to the inner diameter of the conduit 20 may range from about 0.4 up to about 0.94.

As fluid enters the inlet or upstream end of the conduit 20, the fluid is displaced or deflected by the wall 48 of the member 42 into an annular region of progressively decreasing cross-sectional area, to a minimum area at the plane of the peripheral edge 46. The fluid then flows downstream, gradually recovering and returning to free stream flow in the pipe line 12. Due to the displacement produced by the member 42, fluid flow within the conduit 20 is stabilized and conditioned both upstream and downstream from the member 42. In particular, the member 42 is effective to linearize fluid flow in the region between the member 42 and the wall of the conduit 20 and to flatten the velocity profile of fluid flow in the conduit both upstream and downstream from the displacement member over a range of flow rates. Consequently, the flow profile both upstream and downstream is relatively flat, symmetrical, axially centered within the conduit, and of a large and essentially constant mean flow diameter irrespective of flow rate. Also, the fluid or fluids and any solid materials therein are homogenized so that the conduit 20 is filled with an essentially homogeneous mixture throughout substantially its full cross sectional area.

The sharp peripheral edge 46 causes short vortices to be shed from the peripheral edge in the downstream direction. These vortices are of small amplitude and high frequency and thereby contribute to optimization of the return velocity of the fluid flow. Vortices of small amplitude and high frequency effectively eliminate extraneous downstream disturbances or so-called "noise" and thereby facilitate accurate and reliable measurements.

In the preferred embodiment of the flow meter 10, the displacement member 42 is removeably and replaceably mounted in the conduit section or meter body 20 to accommodate replacement of one displacement member by another and different displacement member having, for example, a different configuration or Beta number. For the purpose, the preferred embodiment of the meter includes a mounting assembly 44 at the upstream end of the displacement member to which the upstream end of the displacement member is detachably secured.

The assembly 44 comprises a pipe or conduit made up of a tubular stem or sleeve 54 extending from the downstream flow measurement tap 26 radially into the conduit 20 and a tubular guide 56 secured to the inner end of the sleeve 54 and extending along the axis of the conduit in the downstream direction. The guide 56 and each of the displacement members to be associated therewith have cooperable means, such as mating screw threads, for detachably but securely mounting the displacement member coaxially onto the guide. Different displacement members may thus be attachably/detachably and interchangeably secured to the mounting assembly 44 simply by threading the same onto and off of the guide.

In contrast to the displacement members employed in the previously patented and commercial embodiments of the V-CONE meters and mixers, the displacement member 42 of the invention comprises a single, hollow frustum. The frustum has an exterior or external wall 48 facing in the upstream direction and sloping outwardly from the axis of the frustum in the downstream direction, and an interior or internal wall 62 facing in the downstream direction and also sloping outwardly from the axis of the member in the downstream direction. The walls of the hollow frustum terminate at the plane of the displacement member's maximum diameter. i.e., at the plane of the peripheral edge 46.

The hollow frustum 42 is adapted to be removeably and replaceably mounted on the guide 56 and includes an axial aperture 64 in its base communicating with the tubular conduits in the guide 56 and stem or sleeve 54 and thus with the measuring tap 26. Permanently or replaceably mounted within the aperture 64 is a hollow stem 66 which extends axially rearwardly, i.e., in the downstream direction, along the axis of the hollow frustum. The hollow stem is also in communication with the conduits in the mounting numbers 54 and 56 and with the measurement tap 26 and allows measurement at the tap 26 of fluid flow conditions at or adjacent the downstream end of the stem, at or adjacent the axis of the displacement member.

Figure 2:
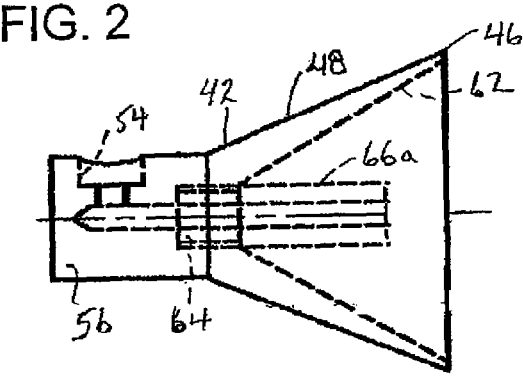
FIG. 2 is a side view of a first embodiment of a displacement member for the fluid flow meter of FIG. 1.
Figure 3:
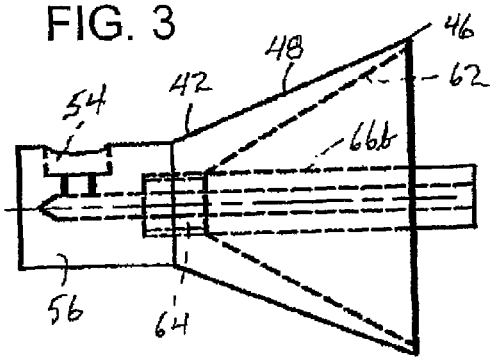
FIG. 3 is a side view of a second embodiment of a displacement member for the fluid flow meter of FIG. 1.
Figure 4:
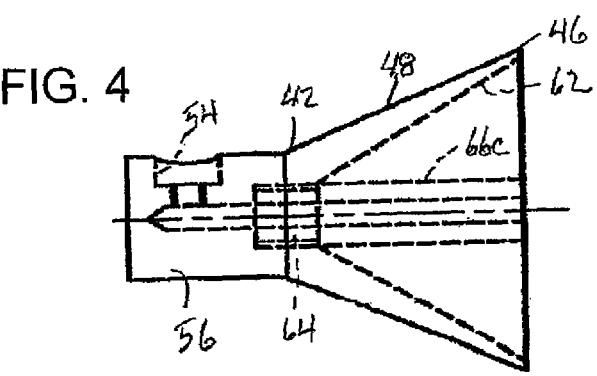
FIG. 4 is a side view of a third embodiment of a displacement member for the fluid flow meter of FIG. 1.

Referring to FIGS. 2, 3 and 4, the hollow stem may be provided in a variety of different lengths, e.g., a short stem 66a (FIG. 2) which terminates within the hollow frustum at a location adjacent and upstream from the plane of the edge 46; or a long stem 66b (FIG. 3) which terminates outside the cone at a location adjacent and downstream from the plane of the edge 46; or a medium length steam 66c (FIG. 4) which terminates at the plane of the edge 46. All three of the illustrated stems facilitate accurate measurement of flow conditions at or adjacent the axis of the displacement member at or adjacent a downstream facing surface of the hollow frustum displacement member, especially at or adjacent the plane of the edge 46.

As an alternative to the embodiment of FIG. 2, the internal, downstream facing wall 62 of the displacement member may be formed as a shallow frustum sloping inwardly in the upstream direction from the plane of the edge 46 to a location corresponding to the downstream end of the stem 66a, in which case the stem 66a would be omitted. However, the FIG. 2 embodiment remains preferred.

The upstream flow measurement tap 24 facilitates determination of one or more fluid flow conditions upstream from the edge 46 of the displacement member 42 and the downstream flow measurement tap 26, communicating via the tubular members 54, 56 and 66, facilitates determination of one or more fluid flow conditions axially of the conduit at or adjacent the plane of the downstream edge of the hollow frustum displacement member 42.

The two measurement taps 24 and 26 are connected with suitable flow measurement instrumentation 27 known in the art in order to provide a read out or read outs of the flow characteristics desired to be determined.

The detachable mounting of the displacement member 42 to the guide pipe or tube 44 is highly advantageous in terms of the manufacture of fluid flow meters and mixing devices, in that standardized manufacturing procedures can be utilized to produce conduit sections and meter bodies of various standard diameters and displacement members of various standard diameters, configurations and beta ratios so that meters and mixers meeting individual specifications can be quickly and economically assembled from standard, in-stock, off-the-shelve components rather then being made to order.

In particular, the hollow frustum displacement member of the invention facilitates manufacture of displacement members to precise dimensions by conventional machining procedures and/or powder injection molding, with complete and accurate consistency and reproducibility. Every displacement member of a given set of dimensions will be identical to every other displacement member of the same set of dimensions. Consequently, by standardization and maintenance of geometric and dimensional identity of both meter bodies and displacement members it may now be feasible to manufacture fluid flow meters to precise performance specifications without need to test and calibrate each meter.

The objects and advantages of the invention have thus been shown to be attained in a convenient, practical, economical and facile manner.

While presently preferred embodiments of the invention have been herein illustrated and described, it is to be appreciated that various changes, rearrangements and modifications may be made therein without departing from the scope of the invention as defined by the appended claims.

The invention claimed is:

1. A fluid flow meter having a conduit defining a longitudinal axis for conveying fluid therethrough in a given direction, a tube extending through the wall of the conduit and having a tubular guide positioned substantially along the axis of the conduit in the downstream direction, and a fluid flow displacement member in the conduit having, in relation to the direction of fluid flow, an upstream end and an downstream end, the displacement member being mounted at its upstream end substantially coaxially on said tubular guide and having between the ends thereof a sloped wall forming a periphery of the displacement member for deflecting the fluid to flow through a region defined between the periphery of the displacement member and an interior surface of the conduit, characterized in that the displacement member comprises a hollow frustum having an exterior wall and an interior wall, the exterior wall slopes outwardly in the downstream direction from adjacent to the axis of the conduit to a downstream peripheral edge spaced from an interior surface of the conduit such that the fluid flows between the peripheral edge and the interior surface of the conduit, the interior wall slopes outwardly in the downstream direction from adjacent to the axis of the conduit to said peripheral edge, and a port in communication with the tube located at or adjacent to the axis of the conduit and at or adjacent to a plane of said peripheral edge that is substantially normal to the axis.

2. The fluid flow meter as set forth in claim 1 wherein the tube comprises a measurement tap at the exterior of the conduit and said port accommodates measurement via the tap of fluid flow within the conduit at or adjacent to the axis of the conduit and at or adjacent to the plane of said peripheral edge.

3. The fluid flow meter as set forth in claim 1 wherein said port comprises a hollow stem extending substantially along the axis of the interior wall of said hollow frustum and having an upstream end in communication with the tube and a downstream end opening at or adjacent to the plane of said peripheral edge.

4. The fluid flow meter as set forth in claim 3 wherein said stem is mounted on said hollow frustum at the upstream end of said interior wall.

5. The fluid flow meter as set forth in claim 3 wherein the downstream end of said hollow stem terminates adjacent to and upstream from the plane of said peripheral edge.

6. The fluid flow meter as set forth in claim 4 wherein the downstream end of said hollow stem terminates adjacent to and downstream from the plane of said peripheral edge.

7. The fluid flow meter as set forth in claim 3 wherein the downstream end of said hollow stem terminates substantially at the plane of said peripheral edge.

8. The fluid flow meter as set forth in claim 1 wherein said port is located adjacent to and upstream from the plane of said peripheral edge.

9. A fluid flow meter comprising:

a conduit for conveying fluid therethrough in a given direction, said conduit having a peripheral wall with an interior surface;

a fluid flow displacement member in said conduit having, in relation to the direction of fluid flow, an upstream end and a downstream end, said displacement member being of smaller size than said conduit and having a sloped wall forming a periphery on said displacement member for deflecting the fluid to flow through a region defined by the periphery of said displacement member and the interior surface of said conduit;

a flow measurement tap extending through the wall of said conduit and communicating with an area within the conduit upstream of the displacement member, and a tube extending through the wall of said conduit and including a tubular guide facing in the downstream direction along the axis of said conduit, said displacement member having a substantially axial passage coupled to said tubular guide, said tube and said axial passage comprising a measurement tap communicating between an area external of the conduit and an area within the conduit located at or adjacent to the axis of the conduit and at or adjacent to the downstream end of said displacement member, said displacement member comprising a hollow frustum sloping outwardly from its upstream end to its downstream end and terminating in a peripheral edge spaced inwardly from the interior surface of the conduit and defining a plane substantially normal to the axis of the conduit, said hollow frustum having an exterior wall and an interior wall, said exterior wall and said interior wall each sloping outwardly in the downstream direction from the axis of said displacement member to the plane of said peripheral edge, said passage extending substantially along the axis of said interior wall and terminating at or adjacent to the plane of said peripheral edge.

10. The fluid flow meter as set forth in claim 9 wherein said passage terminates adjacent to and upstream of the plane of said peripheral edge.

11. The fluid flow meter as set forth in claim 9 wherein said passage terminates adjacent to and downstream from the plane of said peripheral edge.

12. The fluid flow meter as set forth in claim 9 wherein said passage terminates substantially at the plane of said peripheral edge.

13. The fluid flow meter as set forth in claim 9 wherein said passage comprises a hollow stem secured to said hollow frustum and extending substantially along the axis of said interior wall, said stem having an upstream end coupled to said tube and a downstream end terminating at or adjacent to the plane of said peripheral edge.

14. The fluid flow meter as set forth in claim 13 wherein said hollow stem terminates adjacent to and upstream of the plane of said peripheral edge.

15. The fluid flow meter as set forth in claim 13 wherein said hollow stem terminates adjacent to and downstream of the plane of said peripheral edge.

16. The fluid flow meter as set forth in claim 13 wherein said hollow stem terminates substantially at the plane of said peripheral edge.

17. The fluid flow meter as set forth in claim 13 wherein said hollow stem is removeably and replaceably secured to said displacement member.

18. The fluid flow meter as set forth in claim 9 wherein said displacement member is removeably and replaceably mounted in said conduit.

19. A fluid flow meter comprising:

a conduit for conveying fluid therethrough in a given direction, said conduit having a peripheral wall with an interior surface and defining a longitudinal axis;

a fluid flow displacement member in said conduit having, in relation to the direction of fluid flow, an upstream end and a downstream end, said displacement member being of smaller size than said conduit and having a sloped wall forming a periphery on said displacement member for deflecting the fluid to flow through a region defined by the periphery of said displacement member and the interior surface of said conduit;

a flow measurement tap extending through the wall of said conduit and communicating with an area within the conduit upstream of the displacement member, and a tube extending through the wall of said conduit, a portion of said tube facing in the downstream direction along the axis of said conduit, said displacement member having a substantially axial passage coupled to said tube, said tube and said axial passage comprising a measurement tap communicating between an area external of the conduit and an area within the conduit located at or adjacent to the axis of the conduit and at or adjacent to the downstream end of said displacement member, said displacement member comprising a frustum sloping outwardly from its upstream end to its downstream end and terminating in a peripheral edge spaced from the interior surface of the conduit, said displacement member defining a plane substantially normal to the axis of the conduit at said peripheral edge, said passage extending substantially along the axis of said conduit and terminating at or adjacent to the plane at said peripheral edge.

20. The fluid flow meter as set forth in claim 19 wherein the downstream end of said passage terminates adjacent to and upstream from the plane at said peripheral edge.

21. A fluid flow meter comprising:

a conduit for conveying fluid therethrough in a given direction, said conduit having a peripheral wall with an interior surface and defining a longitudinal axis;

a fluid flow displacement member in said conduit having, in relation to the direction of fluid flow, an upstream end and a downstream end;

a first flow measurement tap extending through the wall of said conduit and communicating with an area within the conduit upstream of the displacement member, and a second flow measurement tap extending through the wall of said conduit and into said displacement member, said second flow measurement tap and said displacement member defining a passageway communicating between an area external of the conduit and an area within the conduit located at or adjacent to the axis of the conduit and at or adjacent to the downstream end of said displacement member, said displacement member comprising a frustum sloping outwardly from its upstream end to its downstream end and terminating in a peripheral edge spaced from the interior surface of the conduit, said displacement member defining a plane substantially normal to the axis of the conduit at said peripheral edge.

22. The fluid flow meter as set forth in claim 21 wherein the downstream end of said passageway terminates adjacent to and upstream from the plane of said peripheral edge.

* * * * *

UNITED STATES PATENT AND TRADEMARK OFFICE
CERTIFICATE OF CORRECTION

PATENT NO. : 7,832,283 B2  
APPLICATION NO. : 12/295235  
DATED : November 16, 2010  
INVENTOR(S) : Peters et al.

Page 1 of 1

It is certified that error appears in the above-identified patent and that said Letters Patent is hereby corrected as shown below:

On the Title Page:

Under Item (75) Inventors, please delete "Murietta" and replace with --Murrieta--

In the Claims:

In Column 6, Line 50 of the issued patent, please delete "claim 4" and replace with --claim 3--

In Column 7, Line 20 of the issued patent, please delete "inwardly"

Signed and Sealed this  
Third Day of December, 2013

Margaret A. Focarino  
*Commissioner for Patents of the United States Patent and Trademark Office*